(12) United States Patent
Lee et al.

(10) Patent No.: US 12,041,069 B2
(45) Date of Patent: Jul. 16, 2024

(54) METHOD FOR DGA-DOMAIN DETECTION AND CLASSIFICATION

(71) Applicant: HOSEO UNIVERSITY ACADEMIC COOPERATION FOUNDATION, Chungcheongnam-do (KR)

(72) Inventors: Tae Jin Lee, Seoul (KR); Chan Woong Hwang, Gyeonggi-do (KR); Hyo Sik Kim, Gyeonggi-do (KR)

(73) Assignee: HOSEO UNIVERSITY ACADEMIC COOPERATION FOUNDATION, Chungcheongnam-do (KR)

( * ) Notice: Subject to any disclaimer, the term of this patent is extended or adjusted under 35 U.S.C. 154(b) by 483 days.

(21) Appl. No.: 17/393,567

(22) Filed: Aug. 4, 2021

(65) Prior Publication Data
US 2022/0174082 A1 Jun. 2, 2022

(30) Foreign Application Priority Data
Dec. 1, 2020 (KR) .................. 10-2020-0165503

(51) Int. Cl.
*H04L 9/40* (2022.01)
*G06F 16/28* (2019.01)
*G06N 3/04* (2023.01)

(52) U.S. Cl.
CPC ........ *H04L 63/1425* (2013.01); *G06F 16/285* (2019.01); *G06N 3/04* (2013.01)

(58) Field of Classification Search
None
See application file for complete search history.

(56) References Cited

U.S. PATENT DOCUMENTS

| 2019/0019058 A1* | 1/2019 | Woodbridge | ........ G06V 10/768 |
| 2020/0059451 A1* | 2/2020 | Huang | ................... G06N 3/044 |

OTHER PUBLICATIONS

Basheer N. Al-Duwairi, Fast Flux Watch: A mechanism for online detection of fast flux networks, Sep. 1, 2013, pp. 1-7 (Year: 2013).*
Anand Ravindra Vishwakarma, Network Traffic Based Botnet Detection Using Machine Learning, May 18, 2020, pp. 1-67 (Year: 2020).*

* cited by examiner

*Primary Examiner* — Syed A Roni
(74) *Attorney, Agent, or Firm* — The PL Law Group, PLLC (57) ABSTRACT

A method for detecting and classifying a domain generation algorithm (DGA) generation domain according to an embodiment of the present disclosure includes entering a domain address expressed as a vector of sequence numbers in a TextCNN, and replacing the vector with a one-hot vector corresponding to sequence number vector elements to express image representation.

12 Claims, 9 Drawing Sheets

```
int[][] myArray = {  {236, 189, 189,   0},
                     {236,  80, 189, 189},
                     {236,   0, 189,  80},
                     {236, 189, 189,  80}  };
```

| DOMAIN ADDRESS DIVIDED INTO CHARACTER UNITS | h | t | t | p | : | / | / | w | w | w | . | d | a | u | m | . | n | e | t |

DOMAIN ADDRESS EXPRESSED AS SEQUENCE NUMBERS: 8 2 1 4 4 2 2 2 3 4 1 2 1 9 1 5 2 0 0 0 / 0 6 2 5 5 3 3 3 9 1 3 4 0

DOMAIN ADDRESS EXPRESSED AS ONE-HOT VECTOR (69):

| Feature \ EXAMPLE | hf7aej78v3ief2.net | extranet-altone.fr |
|---|---|---|
| RATIO OF NUMBERS | 0.3125 | 0 |
| NUMBER OF VOWELS | 3 | 6 |
| NUMBER OF HYPHEN AND UNDERSCORE CHARACTERS | 0 | 1 |
| WHETHER COMMON NOUN IS INCLUDED | 0 | 1 |
| NUMBER OF COMMON NOUNS | 0 | 1 |
| NUMBER OF PATTERNS CORRESPONDING TO CHARACTER -> NUMBER, NUMBER -> CHARACTER AFTER 2-gram | 9 | 0 |
| NUMBER OF PATTERNS CORRESPONDING TO VOWEL -> VOWEL AFTER 2-gram | 2 | 2 |
| NUMBER OF PATTERNS CORRESPONDING TO CONSONANT -> CONSONANT AFTER 2-gram | 1 | 0 |

FIG. 9

METHOD FOR DGA-DOMAIN DETECTION AND CLASSIFICATION

CROSS-REFERENCE TO RELATED APPLICATION

This application claims the benefit under 35 USC § 119(a) of Korean Patent Application No. 10-2020-0165503, filed on Dec. 1, 2020, in the Korean Intellectual Property Office, the entire disclosure of which is incorporated herein by reference for all purposes.

BACKGROUND

1. Field of the Invention

The present invention relates to a method for detecting a domain generation algorithm (DGA) generation domain and classifying the detected DGA generation domain.

2. Description of the Related Art

Currently, along with the development of Internet technology, commercial activities and information exchange through the Internet homepage are becoming active. Accordingly, it is a reality that cyber-attack, that is, hacking on the Internet network frequently occurs to obtain financial gain or to acquire important information.

Most cyber-attacks use malicious code, and according to AV-TEST, more than 1 billion malicious codes are expected to appear in 2020. Unlike the recent distribution of malicious codes to unspecified people, APT (Advanced Persistent Threat) attacks are attempted after targeting a single target. APT attack is characterized by not stepping on the attack by creating a sophisticated and systematic security threat based on various IT technologies and attack methods until it successfully penetrates inside. In addition, APT attack mainly targets government agencies or companies, and there is a problem that detection is difficult due to continuous attack by infiltration into the system.

Some malicious codes, such as APT attacks, operate by receiving commands from a remote command & control (C&C) server after being installed on the device. A botnet is a collection of computers or bots infected with malware. This botnet has been major means for cybercriminals to send spam, steal personal data, and launch distributed denial-of-service attacks. Most bots today rely on a domain generation algorithm (DGA) to generate a list of candidate domain names in an attempt to connect to a so-called C&C server.

The attacker uses the C&C server to communicate with the malicious code in real time to perform a desired action. In order for malicious code to receive commands from the C&C server, connection to the server is needed first. For internet communication, a client PC needs to know an IP address of the server in order for the client to connect to the server. Due to this approach, the malicious code needs to have the IP address or domain address of the C&C server inside. When the malicious code hides the IP address or domain address of the C&C server through hard-coding, security equipment or law enforcement agencies can block the IP address or domain address to prevent the device infected with the malicious code from accessing the C&C server. However, a malware creator uses the DGA to bypass such an access blocking technology.

Attackers use the DGA to hide the C&C server. The DGA needs to randomly generate numerous domain addresses every day. Since the DGA can predict a domain addresses created on a specific date, an attacker needs to operate the C&C server and pre-register one of domain addresses that can be created on a specific date through a proper registration process, which is referred to as IP/DNS high-speed flux. In this way, the attacker can change DNS mapping to IP every 10 seconds. However, as many studies related to high-speed flux detection progress, an access control policy such as blacklist management for anomaly DNS can be established. As a result, the attackers developed the DGA and changed the DNS mapping with the C&C server at short time intervals to neutralize the existing blacklist policy, and until recently made it significantly difficult to block the C&C server, which is a problem.

SUMMARY

Therefore, to solve the above problem, an object of the present invention is to provide a method for detecting and classifying DGA generation domain for continuously blocking access to a C&C server by learning a domain address generated through a DGA and detecting a domain address generated by the same DGA.

To achieve the object of the present invention, a method for detecting and classifying a DGA generation domain includes entering a domain address expressed as a vector of sequence numbers in a TextCNN, and replacing the vector with a one-hot vector corresponding to sequence number vector elements to express image representation.

In the method for detecting and classifying a DGA generation domain according to the present invention, the one-hot vector is a one-hot vector having a length 69 corresponding to 70 sequence numbers using sequence numbers for 69 characters including 68 characters and one non-identifiable character and 70 sequence numbers having sequence number 0 added to express padding, sequence number 0 is a zero vector filled with zeros, and sequence numbers 1 to 69 are vectors in which vector elements corresponding to each order are expressed as 1.

In the method for detecting and classifying a DGA generation domain according to the present invention, the domain address expressed as the vector of sequence numbers is subjected to pre-processing before entering the domain address in the TextCNN, and in the pre-processing, first, a string of the domain address is divided into character units, a character is replaced according to a sequence number corresponding to each divided character, padding sequence number 0 is added to make a length 100 when a length of a replaced sequence number vector is less than 100, and an excess sequence number vector is cut off when a length of a sequence vector is longer than 100.

In the method for detecting and classifying a DGA generation domain according to the present invention, a domain address expressed as a vector of size 100*69 is obtained through the one-hot vector, and a convolution process is performed on this domain address.

In the method for detecting and classifying a DGA generation domain according to the present invention, the convolution process includes repetition of a convolution layer and a MaxPooling layer.

In the method for detecting and classifying a DGA generation domain according to the present invention, the convolution layer performs convolution with respect to an input vector using a filter of a predetermined size, the layer includes parameters of a vector size (M), a filter size (K), the number of filters (F), and a stride (S), and the stride indicates a degree of movement of the filter.

In the method for detecting and classifying a DGA generation domain according to the present invention, the MaxPooling layer preserves exclusively a maximum value in a local region of an input vector and reduces a size of the vector.

In the method for detecting and classifying a DGA generation domain according to the present invention, a convolution layer and a MaxPooling layer are repeated twice, and this repetition process includes steps of (a) a first convolution layer receives a vector of size 100*69 and generates a vector of size 96*256 using 256 filters of size 5*69 and a stride value of 1, (b) a first MaxPooling layer performs max pooling for a local region of size 2*256 with respect to the vector of size of 96*256 of step (a), and outputs 256 vectors of size of 48*256, (c) a second convolution layer receives the vector of size 48*256 of step (b), and generates a vector of size 46*256 using 256 filters having a size of 3*256 and a stride value of 1, and (d) a second MaxPooling layer outputs a vector of size 23*256 by performing max pooling on a local region of size 2*256 with respect to the vector of size 46*256 of step (c).

In the method for detecting and classifying a DGA generation domain according to the present invention, the vector of size 23*256 obtained through the repeated convolution process is converted into a single line vector (full layer) to obtain a full layer of size 5,888.

In the method for detecting and classifying a DGA generation domain according to the present invention, 20 DGA classifications are predicted through four ANN processes on the full layer, and the number of nodes in each ANN layer is 512, 512, 100, and 20, respectively.

DETAILED DESCRIPTION

Hereinafter, a preferred embodiment according to the present invention will be described in more detail with reference to the accompanying drawings.

Prior to description of the present invention, the following specific structural or functional descriptions are only exemplified for the purpose of describing embodiment according to a concept of the present invention, and embodiments according to the concept of the present invention may be implemented in various forms and should not be construed as being limited to the embodiments described herein.

In addition, since the embodiment according to the concept of the present invention may have various changes and may have various forms, specific embodiments will be illustrated in the drawings and described in detail herein. However, this is not intended to limit the embodiments according to the concept of the present invention to a specific disclosed form, and should be understood to include all modifications, equivalents and substitutes included in the spirit and scope of the present invention.

First, an operation of a DGA is briefly reviewed as follows.

The DGA generates a random string by inputting a predetermined seed value, and creates a domain address by combining a second-level domain (SLD) and a top-level domain (TLD). Even though the DGA creates millions of domains, since an attacker uses time-series data such as time or exchange rate, the attacker can know at the same time as the seed value so that a domain to be created by the DGA can be predicted. The attacker calculates a domain address to be generated by the DGA in advance and registers and uses the domain address of the C&C server through a legitimate procedure.

A more detailed process of the DGA operation will be described with reference to FIG. 1 as follows.

Figure 1:
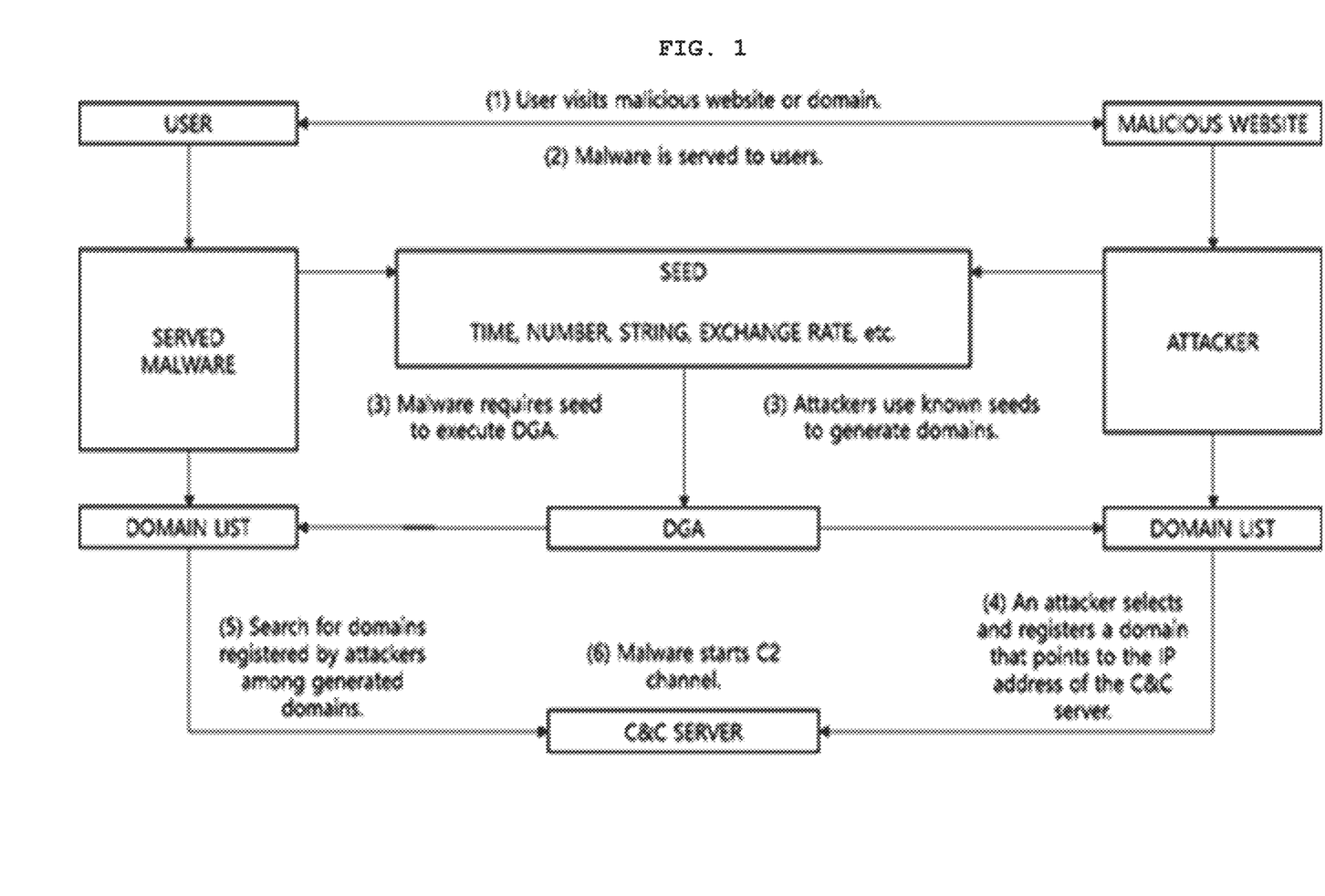
FIG. 1 is a diagram illustrating a more detailed process of a DGA operation.

As illustrated in FIG. 1, a user accesses a malicious website created by an attacker or accesses a server of the attacker through spam mail sent by the attacker (step 1).

Then, the user downloads a malicious code created by the attacker (step 2).

The malicious code downloaded by the user operates the DGA using a predetermined seed value. The seed value appears in various forms such as time, exchange rate, and an attacker-specified string. Further, a random string is generated, and the second-level domain (SLD) and the top-level domain (TLD) are combined to generate a domain address. By predicting the same seed, the attacker can obtain a list of domain addresses generated by the DGA (step 3).

Next, the attacker predicts domain addresses generated through DGA, selects some of the predicted domain addresses, and registers the selected domain addresses in a normal way (step 4).

The malicious code attempts to access all domain addresses created through the DGA (step 5). In the case of a domain address not registered by the attacker, access is not allowed. However, a domain address registered by the attacker in advance is connected to the C&C server of the attacker, and a system of the user is operated by receiving communication of the attacker.

As described above, the DGA can generate millions of domain addresses per day, and it is almost impossible to verify and detect all of the millions of domain addresses to determine whether malicious code exists.

Table 1 shows examples of DGA data types used in the present invention.

TABLE 1

| Domain | DGA | class |
| --- | --- | --- |
| chungpa.co.kr | 0 | 0 |
| heysl.net | 1 | 3 |
| jacko.co.kr | 0 | 0 |
| mwqlxjhmknjxgqt.info | 1 | 8 |
| jjinwhgva.ki | 1 | 9 |
| vkpehgycvap.org | 1 | 13 |
| 27stmjk5ejst.org | 1 | 14 |

A domain column represents a domain address. In a DGA column, 0 means a normal domain, and 1 means a domain address generated through the DGA. In a class column, 0 means a normal domain, and 1 to 19 mean types of DGAs. For example, the domain chungpa.co.kr is not a domain created through the DGA, and therefore there is no DGA type. However, it can be seen that a domain mwqlxjhmknjxgqt.info is a domain address generated through the DGA and indicates a type of DGA named as the type of DGA 8.

In the present invention, the above CNN algorithm was used to detect DGA-generated domains, and 3.6 million domain addresses were used as training data and 400,000 domain addresses were used as verification data.

A CNN (Convolution Neural Network) algorithm is the most used algorithm among deep learning algorithms, and is mainly being used for feature extraction or classification in various regions such as image, video, text, sound, and face recognition. In the CNN algorithm, convolution is Y×Y. As input data passes through a Z×Z filter, a convolution operation is performed (Y>Z), and as the data passes through the filter, a result value is displayed as a feature map. The filter is typically defined as a 4×4 or 3×3 matrix, and is a parameter used for feature extraction.

Figure 2:
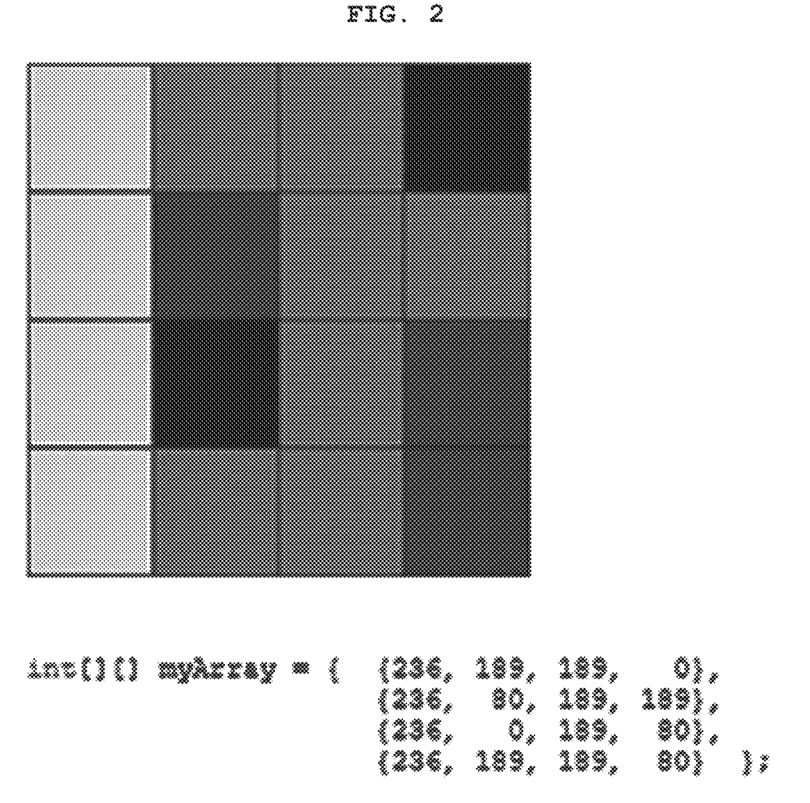
FIG. 2 is a diagram illustrating an example of data representation of an image.

An example of data representation of an image is illustrated in FIG. 2.

Figure 3:
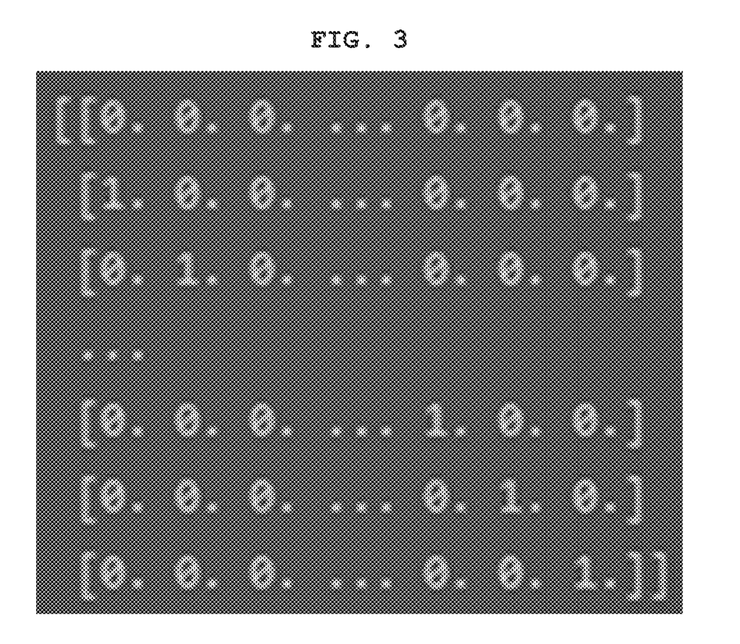
FIG. 3 is a diagram illustrating a one-hot vector.

In the present invention, string data of a domain address is expressed as image data as illustrated in FIG. 2 and used as an input of CNN. In the present invention, sequence numbers are assigned to 69 characters including 68 characters expressed in a string and 1 character that cannot be identified. In addition, a total of 70 sequence numbers were used by adding sequence number 0 to represent padding, and a 69-length one-hot vector corresponding to the 70 sequence numbers was constructed as illustrated in FIG. 3. Sequence number 0 is a zero vector in which all 69 vector elements are filled with 0 (refer to a first vector in FIG. 3), and sequence numbers 1 to 69 are vectors in which vector elements corresponding to each order are expressed as 1.

Figure 4:
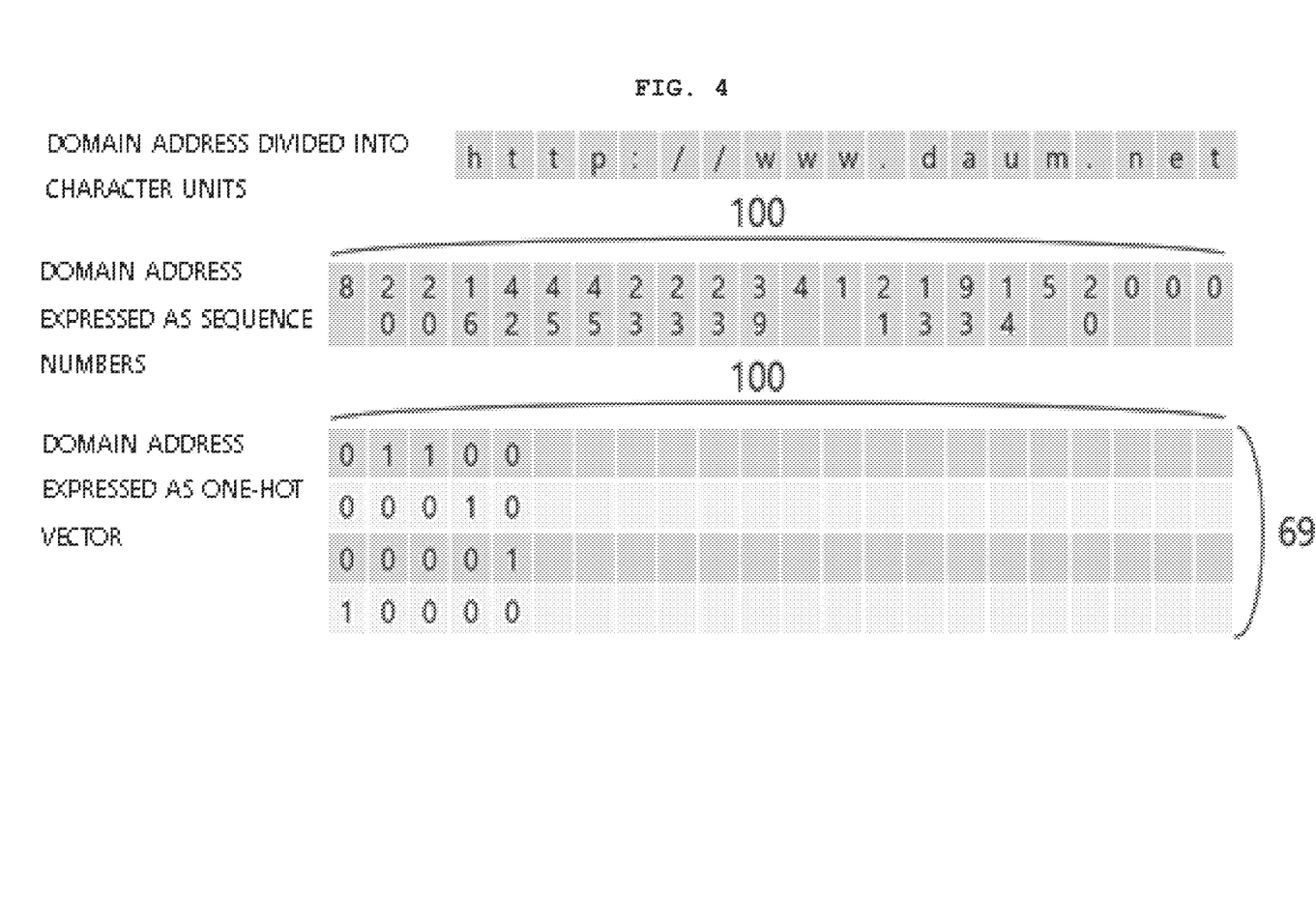
FIG. 4 is a diagram illustrating a process of replacing a string with a vector.

A TextCNN model constructed in the present invention undergoes pre-processing of data before receiving a string. The string of the domain address is divided into character units, and each character is replaced according to the corresponding sequence number. When the length of the replaced sequence number vector is shorter than 100, padding sequence number 0 is added to make the length 100. When the replaced sequence number vector is longer than the length 100, the excess sequence number vector is cut off. An example of this method is illustrated in FIG. 4.

As described above, in the present invention, the TextCNN receives a domain address expressed as a vector of sequence numbers with a length of 100 as input. Thereafter, the sequence number vector element and the corresponding one-hot vector are replaced and expressed as an image representation.

A domain address expressed as a vector of size 100*69 through a one-hot vector undergoes a convolution process. The convolution process includes repetitions of a convolution layer and a MaxPooling layer.

Figure 5:
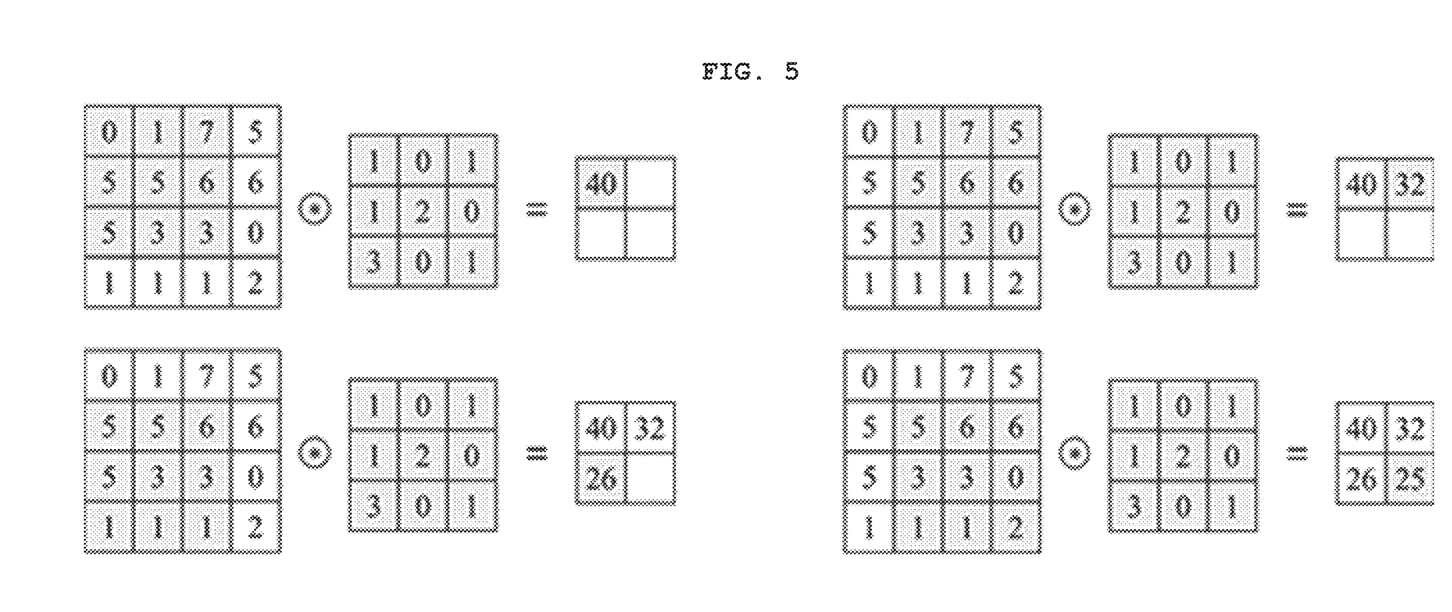
FIG. 5 is a diagram illustrating an example of convolution.

The convolution layer performs convolution with respect to an input vector using a filter of a predetermined size. Important parameters of the convolution layer include an input vector size (M), a filter size (K), the number of filters (F), and a stride (S). The stride indicates a degree of movement of the filter. FIG. 5 is an example of performing convolution by setting one filter of 3*3 size to 1 stride with respect to a vector of 4*4 size. Since one filter is used, a result vector of 2*2*1 is obtained, and a height/width length of the result vector is expressed as (M−K)/S+1.

Figure 6:
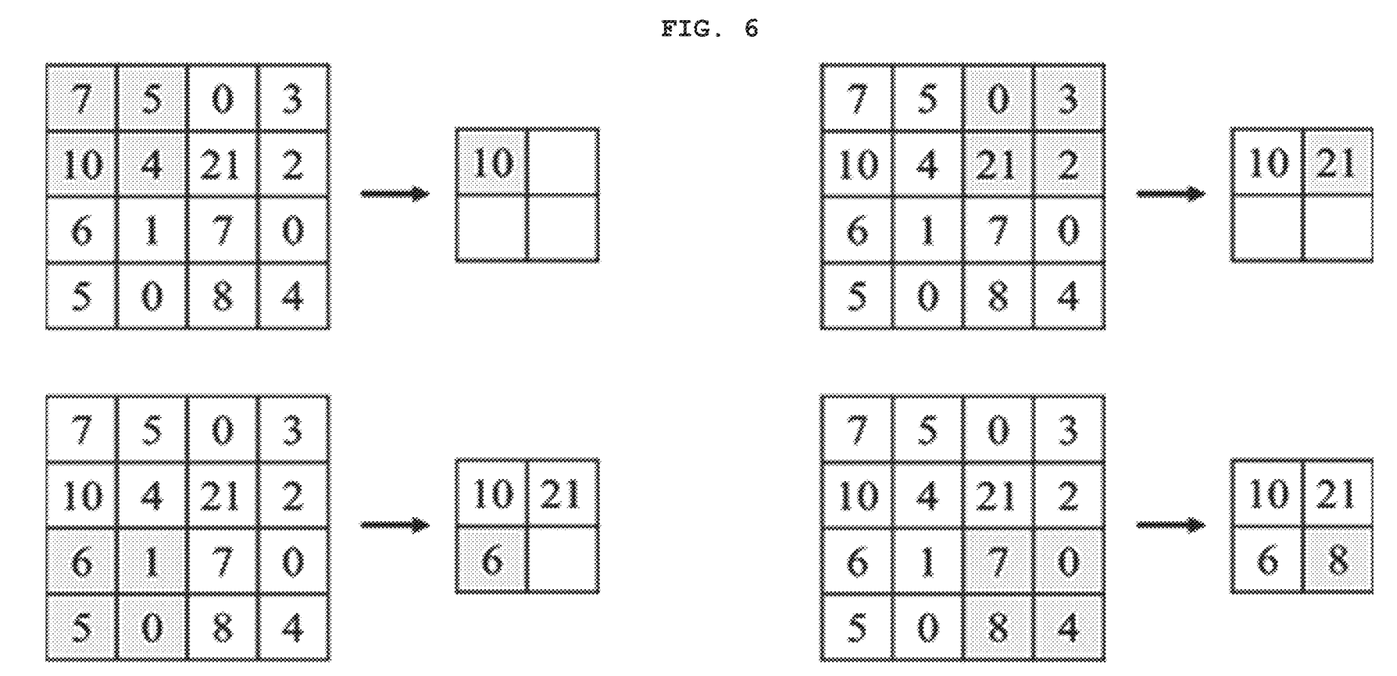
FIG. 6 is a diagram illustrating an example of a reduced vector.

The MaxPooling layer preserves a maximum value of a local region of the input vector and reduces the size of the vector at the same time. Important parameters of the MaxPooling layer are the size of the vector (M) and the size of the local region (N). FIG. 6 illustrates an example of a vector reduced to a size of 2*2 by preserving a maximum value of a local region of the size 2*2 for a vector of a size of 4*4.

As illustrated in FIG. 6, a maximum value in a 2*2 local region at an upper left is '10', a maximum value in a local region at an upper right is '21', a maximum value in a local region at a lower left is '6', and a maximum value in a local region at a lower right is '8'. Therefore, a 2*2 reduction vector maintaining only the maximum value is finally formed.

In the method of the present invention, two convolution layers and a MaxPooling layer were performed. A four-step convolution process performed in the present invention will be described as follows.

(1) A first convolution layer receives a vector of size 100*69 as input. The size of the filter is 5*69 and the number of filters is 256. The stride defaults to 1. A vector of size 96*256 is generated as an output, and the output is passed to a subsequent MaxPooling layer.

(2) For 256 vectors of size 96*256 taken over from step (1), MaxPooling is performed on a local region of size 2*256. 256 vectors of size 48*256 appear as a result and are passed to a second convolution layer.

(3) For the vectors of size 48*256 received from step (2), a convolution layer is performed with filter size 3*256, number of filters 256, and stride 1. As an output, a vector of size 46*256 is generated and passed to a second MaxPooling layer.

(4) The second MaxPooling layer is performed on the vector of size 46*256 received from step (3). The size of the local region is 2*256, and a vector of size 23*256 is obtained as a result.

Figure 7:
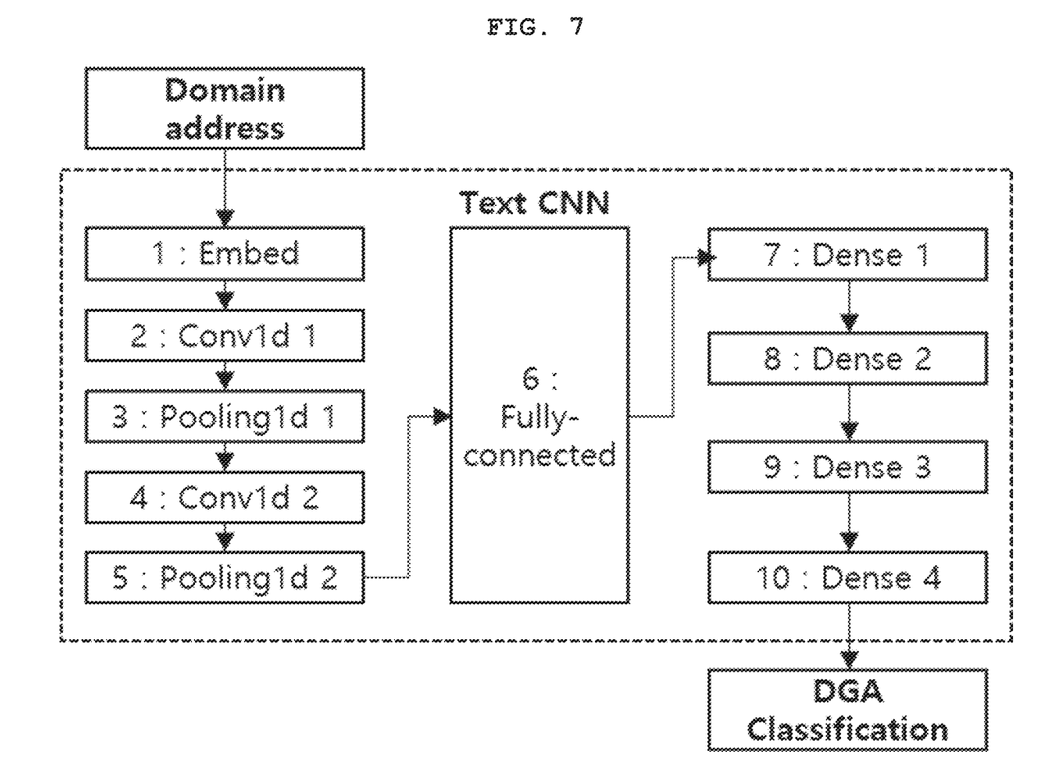
FIG. 7 is a diagram illustrating an overall configuration of a TextCNN used in the present invention.

In the method of the present invention, all vectors having size 23*256 obtained through the repeated convolution process are converted into a single line vector. The converted vector is referred to as a fully-connected layer (hereafter, a full layer). In the present invention, a full layer of size 5,888 can be obtained. From the full layer, 20 DGA classifications are predicted through a total of 4 ANN (Artificial Neural Network) processes. The number of nodes in each ANN layer is 512, 512, 100, and 20. FIG. 7 is an overall configuration diagram of the TextCNN used in the present invention.

Figure 8:
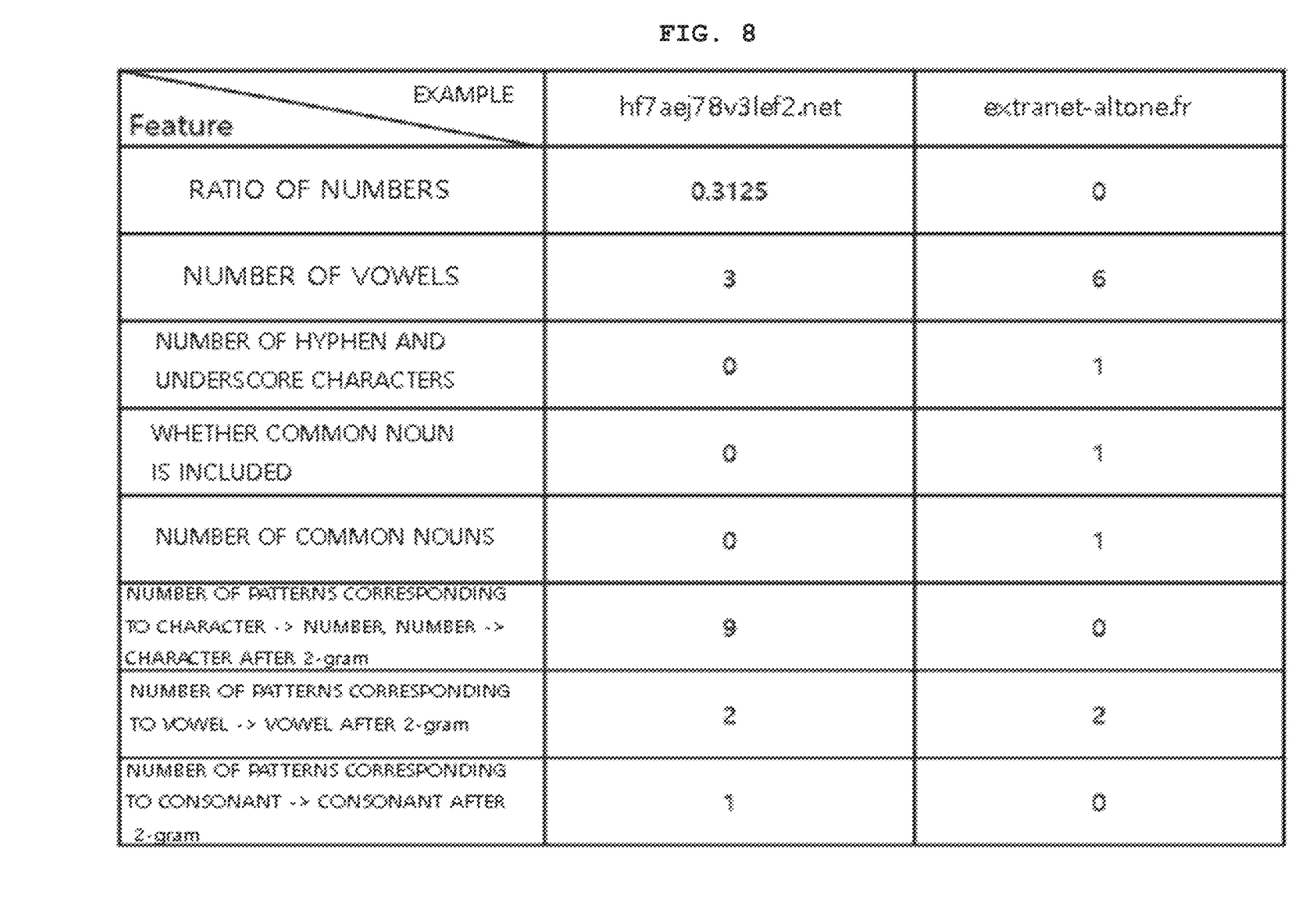
FIG. 8 is a diagram illustrating an example of information found from a string of a domain address.
Figure 9:
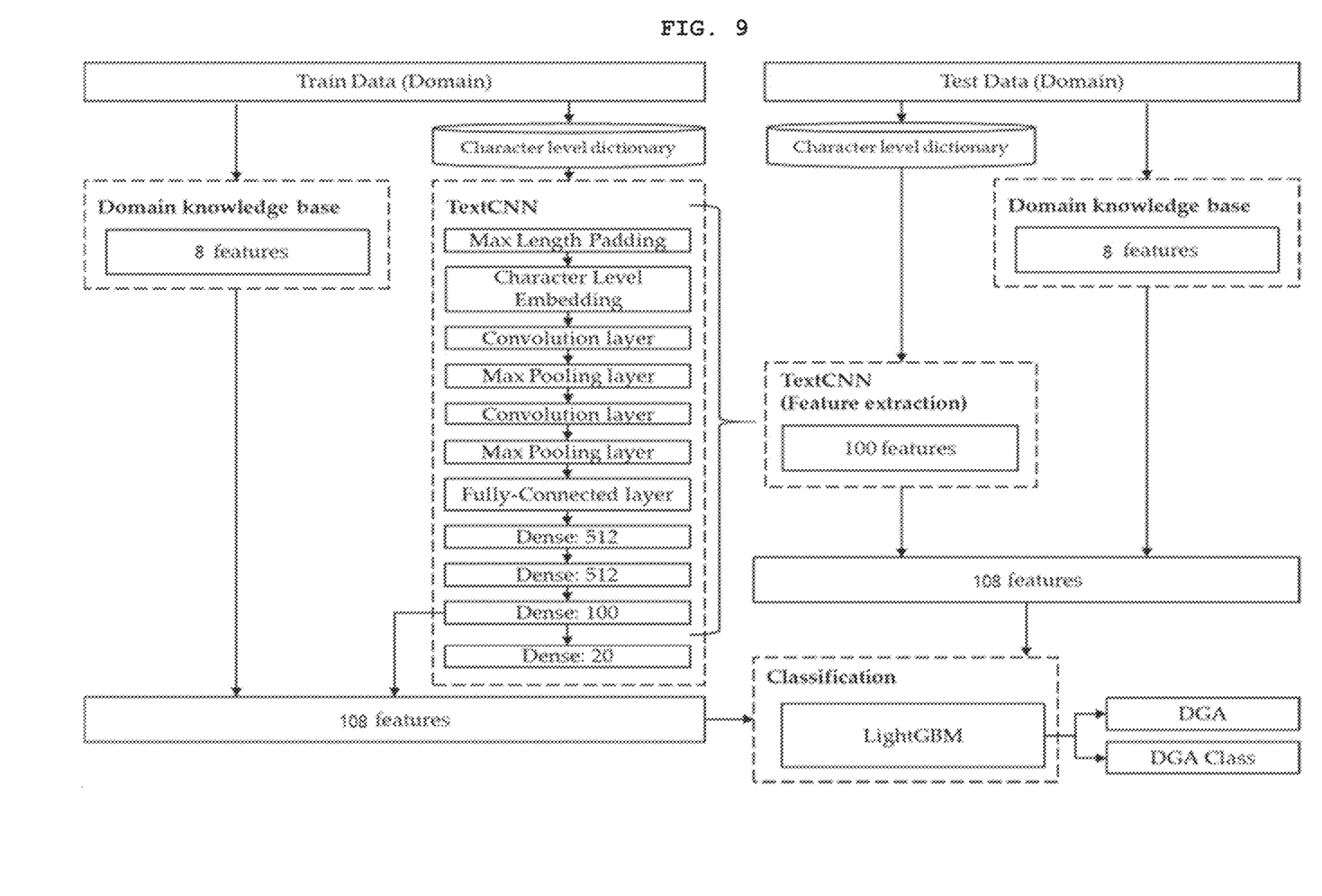
FIG. 9 is a diagram illustrating an overall structure of a LightGbm model using information found from the TextCNN and a string of a domain address.

The DGA detection accuracy of the TextCNN was 97.86%, and the accuracy of classification of 20 DGAs was 85.96%. In addition, in the present invention, it is possible to use a method in which knowledge known from a domain address as well as a string of a domain is added. For example, eight pieces of knowledge may be added, and an example of the added knowledge is illustrated in FIG. 8. Items and description of the added knowledge are as follows.

As a ratio of numbers, a number calculated by dividing the number of counting numbers existing in a domain name by a length of the domain name is used.

As the number of vowels, a number obtained by counting the number of vowels existing in a domain name is used.

As the number of hyphen characters (−) and underscore characters (_) a number obtained by counting hyphen characters and underscore characters existing in a domain name is used.

Whether a common noun is included is classified as '0' when there is no common noun in a domain name and as '1' when natural language exists.

As the number of common nouns, the number obtained by counting the number of common nouns existing in a domain name is used.

As the number of patterns corresponding to ['character', 'number'] or ['number', 'character'], the number obtained by dividing the domain name by 2-gram and counting the number of patterns in which a number is continued after a character or a character is continued after a number is used.

As the number of patterns corresponding to ['consonant', 'consonant'], the number obtained by dividing the domain name by 2-gram and counting the number of patterns in which a consonant and a consonant are continuous is used.

As the number of patterns corresponding to ['vowel', 'vowel'], the number obtained by dividing the domain name by 2-gram and counting the number of patterns in which a vowel and a vowel are continuous is used.

A domain name refers to a host name on a network, and the SLD and TLD indicate a purpose, type, and country of a domain. When a domain address 'example.co.kr' is described as an example, 'example' is a domain name, and 'co' is an SLD. 'kr' is a TLD.

In the present invention, 100 vectors were generated for each domain of training data and validation data through a third ANN layer having 100 nodes in a trained TextCNN model, and 108 vectors were generated for each domain address by adding eight types of domain knowledge extracted from each domain. The generated vector was subjected to DGA detection and 20 DGA classifications through a LightGbm algorithm. LightGbm is one of boosting techniques of ensemble learning, which learns several classifiers sequentially, improves errors through a process of assigning weights to data incorrectly predicted in a previous model, and derives a best result. LightGbm constructs a model by manipulating various parameters. Table 2 shows main parameter setting of the constructed LightGbm.

TABLE 2

| parameter name | value |
| --- | --- |
| boosting_type | gdbt |
| num_boost_round | 100 |
| num_class | 20 |
| objective | multiclass |
| metric | multi_logloss |
| learning_rate | 0.05 |

When the method for detecting and classifying a DGA generation domain according to the present invention is used, only a domain address generated by the DGA can effectively detect whether the corresponding domain address is generated from the DGA and block the domain address without the need for detailed analysis of an operation method of the DGA, thereby easily solving the problem of malicious code.

The scope of the present invention is not limited to the above-described embodiments, and may be implemented in various forms within the scope of the appended claims. Without departing from the gist of the present invention claimed in the claims, it is considered to be within the scope of the claims of the present invention to the extent that various modifications can be made by any person skilled in the art to which the invention pertains.

What is claimed is:

1. A method for detecting and classifying a domain generation algorithm (DGA) generation domain, the method comprising:
    entering a domain address expressed as a vector of sequence numbers in a convolutional neural network for text (TextCNN), and replacing the vector with a one-hot vector corresponding to sequence number vector elements to express image representation,
    wherein the one-hot vector is a one-hot vector having a length 69 corresponding to 70 sequence numbers using sequence numbers for 69 characters including 68 characters and one non-identifiable character and 70 sequence numbers having sequence number 0 added to express padding,
    sequence number 0 is a zero vector filled with zeros, and
    sequence numbers 1 to 69 are vectors in which vector elements corresponding to each order are expressed as 1,
    wherein the domain address expressed as the vector of sequence numbers is subjected to pre-processing before entering the domain address in the TextCNN, and in the pre-processing, first, a string of the domain address is divided into character units, a character is replaced according to a sequence number corresponding to each divided character, padding sequence number 0 is added to make a length 100 when a length of a replaced sequence number vector is less than 100, and an excess sequence number vector is cut off when a length of a sequence vector is longer than 100.

2. The method according to claim 1, wherein a domain address expressed as a vector of size 100*69 is obtained through the one-hot vector, and a convolution process is performed on this domain address.

3. The method according to claim 2, wherein the convolution process includes repetition of a convolution layer and a MaxPooling layer.

4. The method according to claim 3, wherein the convolution layer performs convolution with respect to an input vector using a filter of a predetermined size, the layer includes parameters of a vector size (M), a filter size (K), the number of filters (F), and a stride (S), and the stride indicates a degree of movement of the filter, wherein each of M, K, F and S are a positive integer.

5. The method according to claim 3, wherein the MaxPooling layer preserves exclusively a maximum value in a local region of an input vector and reduces a size of the vector.

6. A method for detecting and classifying a domain generation algorithm (DGA) generation domain, the method comprising:
    entering a domain address expressed as a vector of sequence numbers in a convolutional neural network for text (TextCNN), and replacing the vector with a one-hot vector corresponding to sequence number vector elements to express image representation,
    wherein the one-hot vector is a one-hot vector having a length 69 corresponding to 70 sequence numbers using sequence numbers for 69 characters including 68 characters and one non-identifiable character and 70 sequence numbers having sequence number 0 added to express padding,
    sequence number 0 is a zero vector filled with zeros, and
    sequence numbers 1 to 69 are vectors in which vector elements corresponding to each order are expressed as 1, wherein the domain address expressed as the vector of sequence numbers is subjected to pre-processing before entering the domain address in the TextCNN, and in the pre-processing, first, a string of the domain address is divided into character units, a character is replaced according to a sequence number corresponding to each divided character, padding sequence number 0 is added to make a length 100 when a length of a replaced sequence number vector is less than 100, and an excess sequence number vector is cut off when a length of a sequence vector is longer than 100, wherein a domain address expressed as a vector of size 100*69 is obtained through the one-hot vector, and a convolution process is performed on this domain address, wherein a convolution layer and a MaxPooling layer are repeated twice, and this repetition process includes steps of:

(a) a first convolution layer receives a vector of size 100*69 and generates a vector of size 96*256 using 256 filters of size 5*69 and a stride value of 1;

(b) a first MaxPooling layer performs max pooling for a local region of size 2*256 with respect to the vector of size of 96*256 of step (a), and outputs 256 vectors of size of 48*256;

(c) a second convolution layer receives the vector of size 48*256 of step (b), and generates a vector of size 46*256 using 256 filters having a size of 3*256 and a stride value of 1; and (d) a second MaxPooling layer outputs a vector of size 23*256 by performing max pooling on a local region of size 2*256 with respect to the vector of size 46*256 of step (c).

7. The method according to claim 6, wherein the vector of size 23*256 obtained through the repeated convolution process is converted into a single line vector (full layer) to obtain a full layer of size 5,888.

8. The method according to claim 7, wherein 20 DGA classifications are predicted through four ANN processes on the full layer, and the number of nodes in each artificial neural network (ANN)layer is 512, 512, 100, and 20, respectively.

9. The method according to claim 8, wherein 100 pieces of feature information are extracted from a third layer having 100 nodes in an ANN layer of the TextCNN.

10. The method according to claim 6, wherein eight pieces of knowledge are extracted from a domain name and added to generate 108 vectors for each domain address, and the eight pieces of knowledge are a ratio of numbers existing in each domain name, the number of vowels, the number of hyphen characters (-) and underscore characters (_), whether a common noun is included, the number of common nouns, the number of patterns corresponding to ['character', 'number'] or ['number', 'character'], the number of patterns corresponding to ['consonant', 'consonant'], and the number of patterns corresponding to ['vowel', 'vowel'], wherein the ration of numbers is a number calculated by dividing the number of counting numbers existing in the domain name by a length of the domain name.

11. The method according to claim 10, wherein the knowledge of whether a common noun is included is classified as '0' when there is no common noun in a domain name and as '1' when natural language exists and used.

12. The method according to claim 10, wherein the number obtained by dividing the domain name by 2-gram and counting the number of patterns in which a number is continued after a character or a character is continued after a number is used as the number of patterns corresponding to ['character', 'number'] or ['number', 'character'], the number obtained by dividing the domain name by 2-gram and counting the number of patterns in which a consonant and a consonant are continuous is used as the number of patterns corresponding to ['consonant', 'consonant'], and the number obtained by dividing the domain name by 2-gram and counting the number of patterns in which a vowel and a vowel are continuous is used as the number of patterns corresponding to ['vowel', 'vowel'].

\* \* \* \* \*